United States Patent
Wu

(10) Patent No.: US 9,209,699 B1
(45) Date of Patent: Dec. 8, 2015

(54) POWER SUPPLY WITHOUT USING ELECTROLYTIC CAPACITOR AT INPUT SIDE

(71) Applicant: Excelliance MOS Corporation, Zhubei, Hsinchu County (TW)

(72) Inventor: Sheng Chieh Wu, Zhubei (TW)

(73) Assignee: Excelliance MOS Corporation, Zhubei (TW)

( * ) Notice: Subject to any disclaimer, the term of this patent is extended or adjusted under 35 U.S.C. 154(b) by 0 days.

(21) Appl. No.: 14/613,410

(22) Filed: Feb. 4, 2015

(30) Foreign Application Priority Data

Jan. 21, 2015 (TW) .................................. 104101918

(51) Int. Cl.
*H02M 1/32* (2007.01)
*H02M 3/335* (2006.01)
*H02M 1/44* (2007.01)

(52) U.S. Cl.
CPC ............ *H02M 3/33507* (2013.01); *H02M 1/44* (2013.01)

(58) Field of Classification Search
CPC ... H02M 1/32; H02M 3/33569; H02M 3/335; H02M 3/33507; H02M 3/33523; H02M 3/335592
USPC ............... 363/20, 21.01, 21.12, 21.13, 21.14, 363/21.15, 21.17, 21.18, 50, 56.03, 95, 97
See application file for complete search history.

(56) References Cited

U.S. PATENT DOCUMENTS

| | | | | |
|---|---|---|---|---|
| 5,742,151 A * | 4/1998 | Hwang | ............... | H02M 1/4225 323/207 |
| 7,751,209 B2 * | 7/2010 | Shiroyama | ............. | H02M 1/32 363/20 |
| 8,098,501 B2 * | 1/2012 | Sonobe | ................... | H02M 1/36 323/284 |
| 8,537,574 B2 * | 9/2013 | Isogai | ..................... | H02M 1/32 363/21.12 |
| 8,717,781 B2 * | 5/2014 | Nate | ....................... | H02M 1/36 363/21.01 |
| 8,724,346 B2 * | 5/2014 | Nate | ................. | H02M 3/33507 363/21.01 |
| 8,891,997 B2 * | 11/2014 | Samejima | ................. | H02J 3/24 363/21.08 |
| 2010/0302811 A1 * | 12/2010 | Saint-Pierre | ....... | H05B 33/0815 363/21.01 |
| 2013/0077357 A1 * | 3/2013 | Zhang | ............... | H02M 3/33507 363/21.16 |
| 2013/0301309 A1 * | 11/2013 | Chen | ................. | H02M 3/33523 363/21.12 |
| 2014/0132179 A1 * | 5/2014 | McAuliffe | ............ | H02M 3/156 315/291 |

* cited by examiner

*Primary Examiner* — Adolf Berhane
(74) *Attorney, Agent, or Firm* — Alan D. Kamrath; Kamrath IP Lawfirm, P.A.

(57) ABSTRACT

A power supply is provided, including a bridge rectifier, a film capacitor and a DC-to-DC converter. The bridge rectifier rectifies an input voltage of an AC power supply to produce a full-wave rectified voltage. The film capacitor filters the full-wave rectified voltage to produce a first pulsating DC voltage. A control circuit of the DC-to-DC converter attenuates the first pulsating DC voltage to produce a second pulsating DC voltage, detects a peak value and a valley value of the second pulsating DC voltage, and produces an OCP compensation value of $-(Vx-VH)+PH$ accordingly, where Vx refers to the second pulsating DC voltage, VH refers to the valley value, and PH refers to the peak value. The control circuit provides an OCP function and a constant output power limitation for the DC-to-DC converter according to a compensated OCP setting value produced by adding the OCP compensation value to an OCP setting value.

8 Claims, 6 Drawing Sheets

POWER SUPPLY WITHOUT USING ELECTROLYTIC CAPACITOR AT INPUT SIDE

BACKGROUND OF THE INVENTION

1. Field of the Invention

The invention relates to a power supply. More particularly, the invention relates to a power supply without using an electrolytic capacitor at its input side, which may be adapted to a small-size liquid-crystal display (LCD).

2. Description of the Related Art

Referring to FIG. 1, there is shown a schematic diagram of a conventional power supply 1 adapted to a small-size LCD. The power supply 1 includes an electromagnetic interference (EMI) filter 11, a bridge rectifier 12, an electrolytic capacitor 13, and a flyback converter 14. An input voltage provided by an alternating-current (AC) power supply passes through the EMI filter 11 which is used to suppress conducted EMI noise, and then the input voltage is rectified by the bridge rectifier 12 to produce a full-wave rectified voltage. The electrolytic capacitor 13 filters the full-wave rectified voltage and stores its transferred energy to produce a stable direct-current (DC) voltage Vdc. Because the electrolytic capacitor 13 has a larger capacitance value to store more energy or have better energy storage capability, the voltage Vdc across the electrolytic capacitor 13 has much smaller ripple and is regarded as a stable DC voltage source. The DC voltage Vdc is converted by the flyback converter 14 to produce output voltages Vo1 and Vo2. The output voltage Vo1 is, for example, 12 V or 16 V which may supply power to a light-emitting diode (LED) backlight driving circuit and a display panel driving circuit of the LCD, and the output voltage Vo2 is, for example, 5 V which may supply power to a mainboard of the LCD.

The flyback converter 14 includes a converting circuit and a control circuit. The converting circuit includes a transformer T1, a power transistor Q1, diodes D1 and D2, and capacitors C1 and C2. The control circuit includes a pulse-width modulation (PWM) controller U1, resistors R1 and R2, a diode D3, capacitors C3 and C4, and an output feedback circuit FB1. To protect and limit the output power of the power supply 1 (i.e., the output power of the flyback converter 14), an over current protection (OCP) function is introduced into the control circuit of the flyback converter 14. In the embodiment, the control circuit uses the PWM controller U1 having the OCP function, for example, an EM8672 integrated circuit (IC) having 7 pins CT, COMP, CS, GND, OUT, VCC, and HV. The PWM controller U1 uses an OCP comparator CMP1 to perform the OCP function by obtaining, through the pin CS, a voltage Vr1 across the resistor R1 coupled between the power transistor Q1 and ground, and comparing the voltage Vr1 with a fixed OCP setting value Vset. When the voltage Vr1 is greater than the OCP setting value Vset, it indicates that the output power of the flyback converter 14 exceeds its rated output power, and therefore, the control circuit has to perform some action to protect the converting circuit. For example, the OCP comparator CMP1 controls a control logic circuit CTRL1 to limit a duty cycle of a PWM control signal outputted to the power transistor Q1 through the pin OUT, or to directly turn off the power transistor Q1, to achieve the OCP function and a constant output power limitation. For different rated output power applications, it only has to change the resistance value of the resistor R1 to change the rated output power limitation.

The conventional power supply 1 uses the electrolytic capacitor 13 at its input side to filter the full-wave rectified voltage produced by the rectification of the bridge rectifier 12 and store its transferred energy to produce the stable DC voltage Vdc, and therefore, under the normal operating condition, the voltage Vdc across the electrolytic capacitor 13 equals to the peak value of the input voltage of the AC power supply. Taking mains AC power supply of 220 Vrms as an example, the voltage Vdc across the electrolytic capacitor 13 is approximately 311 V. The high voltage may build up more static charges on two electrodes of the electrolytic capacitor 13, and under some condition (e.g., the abnormally increased input voltage of the AC power supply), the static charges built up on the electrodes may cause arc or spark discharge to result in the burning of fuels such as an electrolyte and a paper spacer in the electrolytic capacitor 13.

SUMMARY OF THE INVENTION

It is therefore an object of the invention to provide a power supply without using an electrolytic capacitor at its input side to save cost, eliminate the probability of the burning of the electrolytic capacitor, and achieve the OCP function and the constant output power limitation.

To achieve the above object or other objects, the invention provides a power supply including a bridge rectifier, a film capacitor, and a DC-to-DC converter, in which the DC-to-DC converter includes a control circuit. The bridge rectifier receives an input voltage of an AC power supply, and rectifies the input voltage to produce a full-wave rectified voltage. The film capacitor receives the full-wave rectified voltage, and filters the full-wave rectified voltage to produce a first pulsating DC voltage. The control circuit receives the first pulsating DC voltage, attenuates the first pulsating DC voltage to produce a second pulsating DC voltage, detects a peak value and a valley value of the second pulsating DC voltage, and produces an OCP compensation value according to the second pulsating DC voltage, the peak value and the valley value. The OCP compensation value is −(Vx−VH)+PH, where Vx refers to the second pulsating DC voltage, VH refers to the valley value, and PH refers to the peak value. The control circuit provides an OCP function and a constant output power limitation for the DC-to-DC converter according to a compensated OCP setting value produced by adding the OCP compensation value to an OCP setting value.

In accordance with an embodiment of the invention, the control circuit may include an attenuator, a peak/valley holding circuit, a subtractor, an inverter and an adder. The attenuator attenuates the first pulsating DC voltage to produce the second pulsating DC voltage. The peak/valley holding circuit detects the peak value and the valley value of the second pulsating DC voltage. The subtractor subtracts the valley value from the second pulsating DC voltage to produce a first voltage. The inverter performs a negation operation on the first voltage to produce a second voltage. The adder adds the peak value and the OCP setting value to the second voltage to produce the compensated OCP setting value.

In accordance with another embodiment of the invention, the control circuit may include an attenuator, a peak/valley holding circuit, a subtractor, an inverter, and an adder. The attenuator attenuates the first pulsating DC voltage to produce the second pulsating DC voltage. The peak/valley holding circuit detects the peak value and the valley value of the second pulsating DC voltage. The subtractor subtracts the peak value from the second pulsating DC voltage to produce a first voltage. The inverter performs a negation operation on the first voltage to produce a second voltage. The adder adds the valley value and the OCP setting value to the second voltage to produce the compensated OCP setting value.

In accordance with another embodiment of the invention, the control circuit may include an attenuator, a peak/valley holding circuit, an inverter, and an adder. The attenuator attenuates the first pulsating DC voltage to produce the second pulsating DC voltage. The peak/valley holding circuit detects the peak value and the valley value of the second pulsating DC voltage. The inverter performs a negation operation on the second pulsating DC voltage to produce a voltage. The adder adds the peak value, the valley value and the OCP setting value to the voltage outputted from the inverter to produce the compensated OCP setting value.

In accordance with an embodiment of the invention, the power supply may further include an EMI filter. The bridge rectifier receives the input voltage passing through the EMI filter.

In accordance with an embodiment of the invention, the power supply may further include an inductor. The inductor and the film capacitor compose a low-pass LC filter coupled between the bridge rectifier and the DC-to-DC converter.

In accordance with another embodiment of the invention, the power supply may further include an inductor and another film capacitor. The inductor, the film capacitor and the another film capacitor composes a low-pass π filter coupled between the bridge rectifier and the DC-to-DC converter.

In accordance with an embodiment of the invention, the DC-to-DC converter may include a flyback converter.

In summary, the power supply of the invention uses the film capacitor in its input side instead of the conventional common electrolytic capacitor. Therefore, it may eliminate the probability of the burning of the electrolytic capacitor because the film capacitor may not have any electrolyte and any paper spacer, and may save cost because the film capacitor is cheaper than the electrolytic capacitor. In addition, the control circuit of the power supply may detect the voltage (i.e., the first pulsating DC voltage) across the film capacitor, perform some operations such as attenuating, negation, etc. on the first pulsating DC voltage to produce the OCP compensation value, and then add the OCP compensation value to the fixed OCP setting value to produce the adaptive compensated OCP setting value. Next, the control circuit may compare the adaptive compensated OCP setting value and a voltage corresponding to a primary current of a transformer of the DC-to-DC converter to achieve the OCP function and the constant output power limitation even if the magnitude of ripple of the first pulsating DC voltage varies with load.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Figure 1:
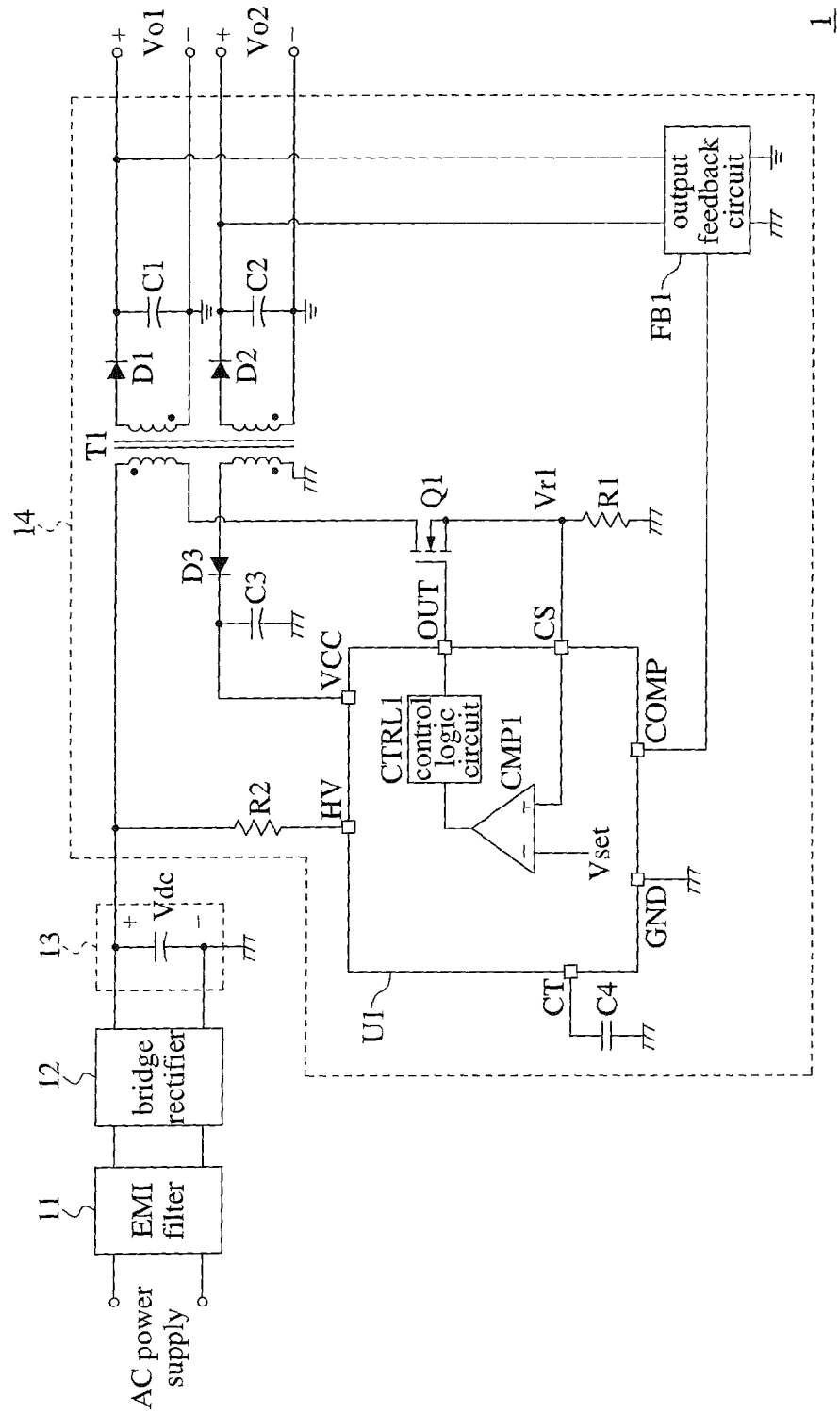
FIG. 1 is a schematic diagram of a conventional power supply adapted to a small-size LCD.

Reference will now be made in detail to the preferred embodiments of the invention, examples of which are illustrated in the accompanying drawings. Wherever possible, the same reference numbers are used in the drawings and the description to refer to the same or like parts.

Figure 2:
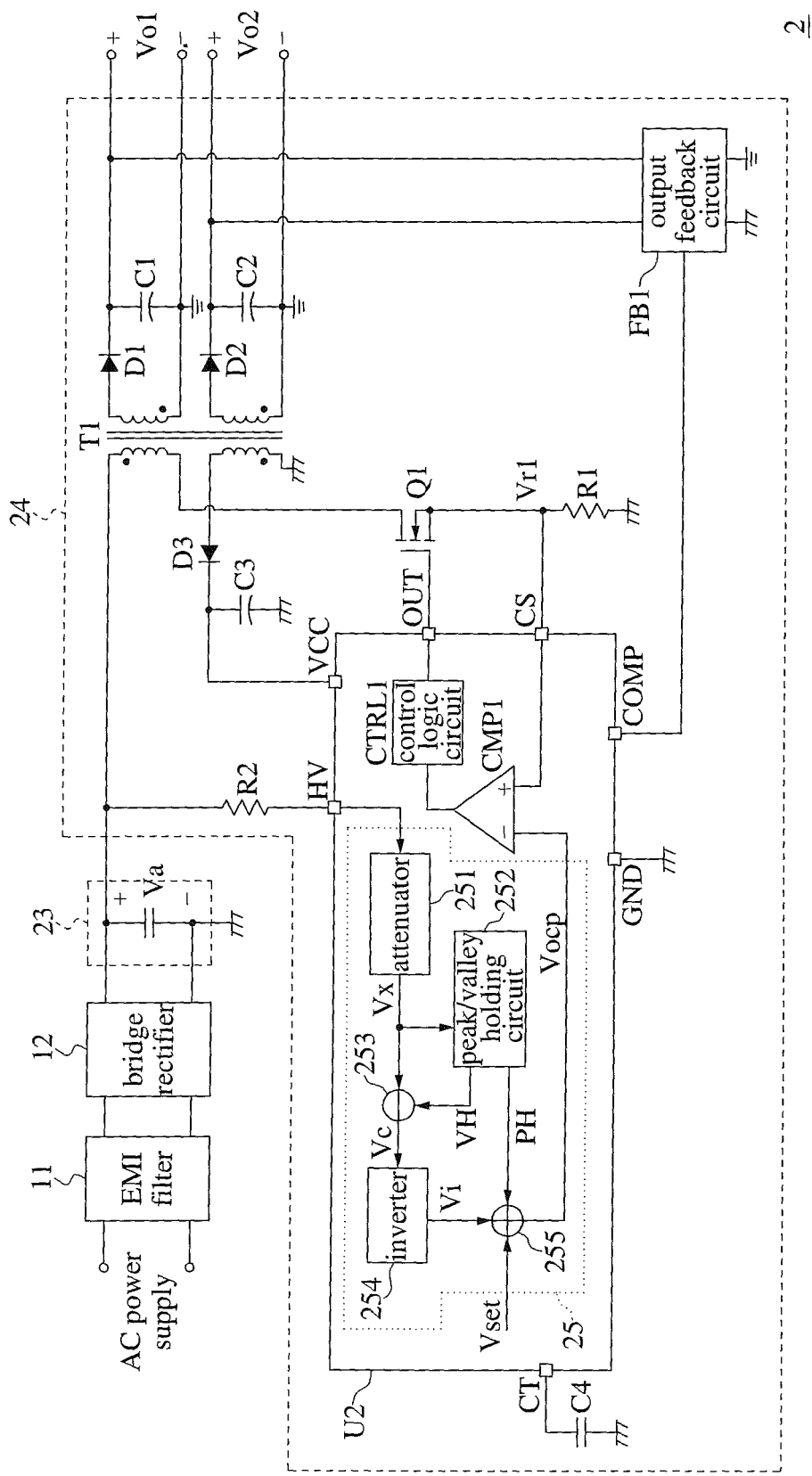
FIG. 2 is a schematic diagram of a power supply adapted to a small-size LCD in accordance with an embodiment of the invention.

Referring to FIG. 2, there is shown a schematic diagram of a power supply 2 adapted to a small-size LCD in accordance with an embodiment of the invention. The power supply 2 of the invention includes an EMI filter 11, a bridge rectifier 12, a film capacitor 23, and a DC-to-DC converter 24, in which the film capacitor is also known as a plastic film capacitor. An input voltage provided by an AC power supply passes through the EMI filter 11 which is used to suppress conducted EMI noise, and then the input voltage is rectified by the bridge rectifier 12 to produce a full-wave rectified voltage. The film capacitor 23 filters the full-wave rectified voltage and stores its transferred energy to produce a first pulsating DC voltage Va. Because the film capacitor 23 has a smaller capacitance value to store less energy or have bad energy storage capability, the waveform of the voltage Va across the film capacitor 23, as shown in FIG. 3, is a pulsating DC waveform having larger ripple whose magnitude varies with load, and therefore, the voltage Va across the film capacitor 23 is called the first "pulsating DC voltage."

Figure 3:
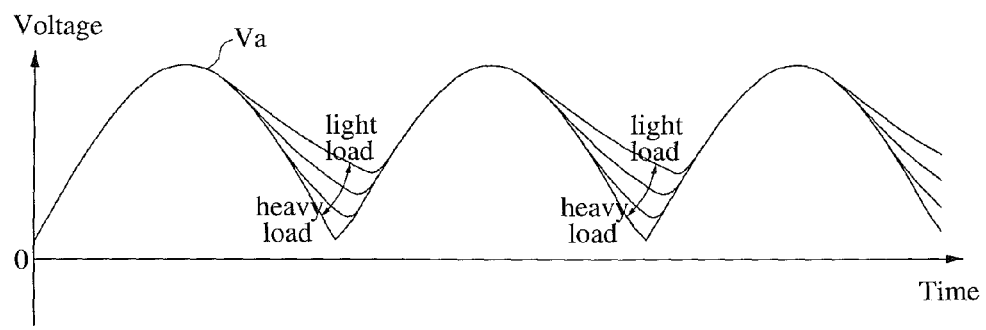
FIG. 3 is a waveform diagram of a voltage across the film capacitor shown in FIG. 2 under light and heavy loads.

Referring to FIG. 3, under the light load condition, the amount of energy which is transferred from the AC power supply to and stored in the film capacitor 23 is larger than the demand of the output load, and therefore, the film capacitor 23 starts to store spare energy and the waveform of the voltage (i.e., the first pulsating DC voltage) Va across the film capacitor 23 is a pulsating DC waveform having smaller ripple or shallower valley. Under the heavy load condition, because the film capacitor 23 has bad energy storage capability, the waveform of the voltage (i.e., the first pulsating DC voltage) Va across the film capacitor 23 is a pulsating DC waveform having larger ripple or deeper valley, and especially when the load becomes heavier, the waveform of the voltage Va across the film capacitor 23 becomes more similar to the waveform of the full-wave rectified voltage. Therefore, when the magnitude of ripple of the first pulsating DC voltage Va varies with load, the peak value of the first pulsating DC voltage Va is fixed (and equals to the peak value of the input voltage of the AC power supply), and the valley value of the first pulsating DC voltage Va is variable.

Referring back to FIG. 2, the invention uses the film capacitor 23 instead of the electrolytic capacitor 13 shown in FIG. 1. Because the film capacitor 23 may not have any electrolyte and any paper spacer, it may eliminate the probability of the burning of the electrolytic capacitor 13. The first pulsating DC voltage Va is converted by the DC-to-DC converter 24 to produce output voltages Vo1 and Vo2. The output voltage Vo1 is, for example, 12 V or 16 V which may supply power to an LED backlight driving circuit and a display panel driving circuit of the LCD, and the output voltage Vo2 is, for example, 5 V which may supply power to a mainboard of the LCD. In the embodiment, the DC-to-DC converter 24 uses the topology of the flyback converter 14 shown in FIG. 1; however, the DC-to-DC converter 24 now receives the first pulsating DC voltage Va rather than the stable DC voltage Vdc shown in FIG. 1. Therefore, to protect and limit the output power of the DC-to-DC converter 24, and also to achieve the constant output power limitation, the invention introduces an OCP compensation circuit 25 into the PWM controller U1 having the OCP function shown in FIG. 1 to form a PWM controller U2 which may provide the OCP function and the constant output power limitation for the DC-to-DC converter 24. Specifically, in the embodiment, the DC-to-DC converter 24 is a flyback converter which includes a converting circuit and a control circuit. The converting circuit includes a transformer T1, a power transistor Q1, diodes D1 and D2, and capacitors C1 and C2. The control circuit includes the PWM controller U2, resistors R1 and R2, a diode D3, capacitors C3 and C4, and an output feedback circuit FB1.

Figure 4:
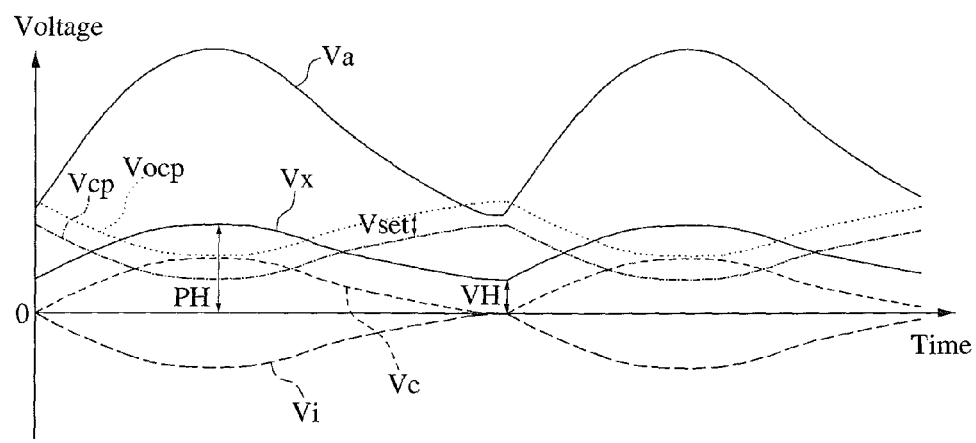
FIG. 4 is a waveform diagram of voltages at nodes of the OCP compensation circuit shown in FIG. 2.

Referring to FIG. 2 in conjunction with FIG. 4, FIG. 4 is a waveform diagram of voltages at nodes of the OCP compensation circuit 25 shown in FIG. 2. The PWM controller U2 may be implemented by introducing the OCP compensation circuit 25 into the PWM controller U1 having the OCP function (e.g., EM8672 IC), which has 7 pins CT, COMP, CS, GND, OUT, VCC, and HV. The OCP compensation circuit 25 includes an attenuator 251, a peak/valley holding circuit 252, a subtractor 253, an inverter 254, and an adder 255. The attenuator 251 is, for example, a voltage divider including resistors coupled in a variety of series and/or parallel combinations. The attenuator 251 receives the first pulsating DC voltage Va through the pin HV and the resistor R2, and attenuates the first pulsating DC voltage Va by a factor of X to produce a second pulsating DC voltage Vx (i.e., Vx=Va/X, where X is a real number). To attenuate the first pulsating DC voltage Va by the factor of X is to reduce its voltage level to be adapted to follow-up circuit units in the OCP compensation circuit 25 to perform signal processing. In addition, the second pulsating DC voltage Vx and the first pulsating DC voltage Va are directly proportional, and therefore, the second pulsating DC voltage Vx also includes information about the magnitude of ripple (or the valley value) of the first pulsating DC voltage Va which varies with load. The peak/valley holding circuit 252 detects, cycle by cycle, a peak value PH and a valley value VH of the second pulsating DC voltage Vx, and holds them to output.

The subtractor 253 subtracts the valley value VH from the second pulsating DC voltage Vx to produce a first voltage Vc (i.e., Vc=Vx−VH). To subtract the valley value VH from the second pulsating DC voltage Vx is to compensate variable valley value of the second pulsating DC voltage Vx which varies with load, and therefore, the first voltage Vc is a pulsating waveform which has no DC component and varies with the second pulsating DC voltage Vx (or the first pulsating DC voltage Va). The inverter 254 performs a negation operation on the first voltage Vc to produce a second voltage Vi (i.e., Vi=−Vc), and therefore, the second voltage Vi is a pulsating waveform which has no DC component and inversely varies with the second pulsating DC voltage Vx (or the first pulsating DC voltage Va).

The adder 255 adds the peak value PH and the fixed OCP setting value Vset to the second voltage Vi to produce a compensated OCP setting value Vocp (i.e., Vocp=Vi+PH+Vset). To add the peak value PH (which equals to the peak value of the input voltage of the AC power supply) to the second voltage Vi is to produce an OCP compensation value Vcp (i.e., Vcp=Vi+PH) used to compensate the fixed OCP setting value Vset to achieve the constant output power limitation. The OCP compensation value Vcp inversely varies with the first pulsating DC voltage Va, and therefore, at the peak of the first pulsating DC voltage Va, the OCP compensation value Vcp is smaller to make the compensated OCP setting value Vocp (i.e., Vocp=Vcp+Vset) smaller to limit and make the primary current of the transformer T1 smaller; and, at the valley of the first pulsating DC voltage Va, the OCP compensation value Vcp is larger to make the compensated OCP setting value Vocp larger to limit and make the primary current of the transformer T1 larger, whereby it may achieve the OCP function and the constant output power limitation. Moreover, to add the PH (which equals to the peak value of the input voltage of the AC power supply) to the second voltage Vi (which has no DC component and inversely varies with the first pulsating DC voltage Va) is to make the output power of the flyback converter 24, under the same condition, equal to that of the flyback converter 14 shown in FIG. 1.

The PWM controller U2 uses an OCP comparator CMP1 to perform the OCP function by obtaining, through the pin CS, a voltage Vr1 across the resistor R1 coupled between the power transistor Q1 and ground, and comparing the voltage Vr1 with the compensated OCP setting value Vocp. When the voltage Vr1 is greater than the compensated OCP setting value Vocp, it indicates that the output power of the DC-to-DC converter 24 exceeds its rated output power, and therefore, the control circuit has to perform some action to protect the converting circuit. For example, the OCP comparator CMP1 controls a control logic circuit CTRL1 to limit a duty cycle of a PWM control signal outputted to the power transistor Q1 through the pin OUT, or to directly turn off the power transistor Q1, to achieve the OCP function and a constant output power limitation. For different rated output power applications, it only has to change the resistance value of the resistor R1 to change the rated output power limitation.

It should be noted that, in the embodiment, the OCP setting value Vset is a fixed value preset in the PWM controller U2, but the invention is not limited to the embodiment. For example, the OCP setting value Vset may be designed to be externally set through a pin of the PWM controller, and once the external set is done, the OCP setting value Vset is also a fixed value. In addition, the OCP compensation value Vcp=Vi+PH=−Vc+PH=−(Vx−VH)+PH. Vcp=−(Vx−VH)+PH, and the formula Vcp=−(Vx−VH)+PH may be rewritten in mathematical statement, for example, Vcp=−(Vx−PH)+VH or Vcp=−Vx+PH+VH. Therefore, the OCP compensation circuit is not limited to the embodiment of the OCP compensation circuit 25.

Figure 5:
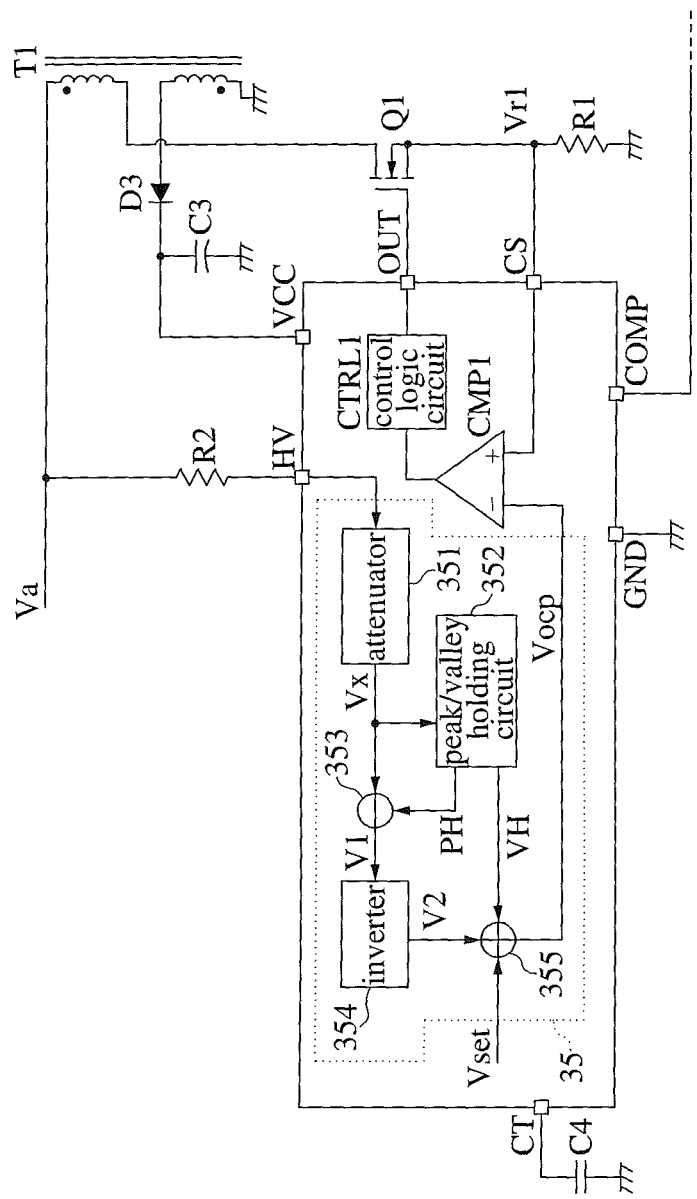
FIG. 5 is a schematic diagram of another embodiment of the OCP compensation circuit shown in FIG. 2.

Referring to FIG. 5, there is shown a schematic diagram of another embodiment of the OCP compensation circuit 25 shown in FIG. 2. An OCP compensation circuit 35 includes an attenuator 351, a peak/valley holding circuit 352, a subtractor 353, an inverter 354, and an adder 355. The attenuator 351 attenuates the first pulsating DC voltage Va by a factor of X to produce a second pulsating DC voltage Vx (i.e., Vx=Va/X, where X is a real number). The peak/valley holding circuit 352 detects, cycle by cycle, a peak value PH and a valley value VH of the second pulsating DC voltage Vx, and holds them to output. The subtractor 353 subtracts the peak value PH from the second pulsating DC voltage Vx to produce a first voltage V1 (i.e., V1=Vx−PH) which varies with the first pulsating DC voltage Va. The inverter 354 performs a negation operation on the first voltage V1 to produce a second voltage V2 (i.e., V2=−V1) which inversely varies with the first pulsating DC voltage Va. The adder 355 adds the valley value VH and the fixed OCP setting value Vset to the second voltage V2 to produce a compensated OCP setting value Vocp; that is, Vocp=V2+VH+Vset=−V1+VH+Vset=−(Vx−PH)+VH+Vset. In the embodiment, the OCP compensation value Vcp=−(Vx−PH)+VH.

Figure 6:
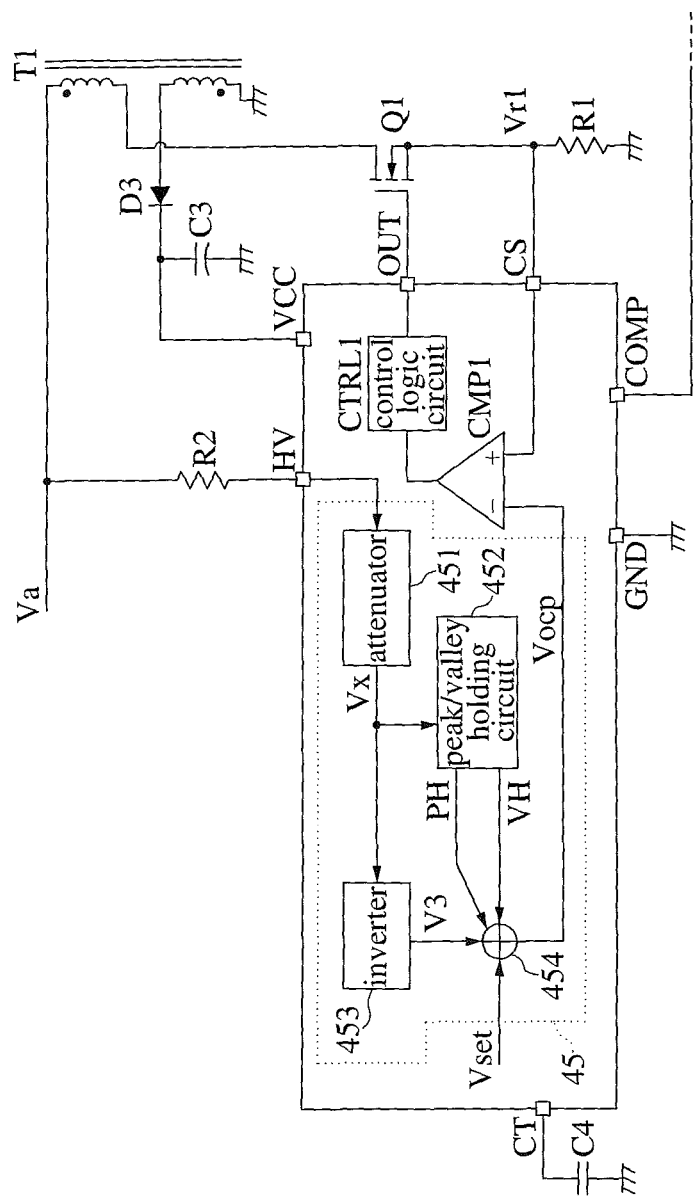
FIG. 6 is a schematic diagram of yet another embodiment of the OCP compensation circuit shown in FIG. 2.

Referring to FIG. 6, there is shown a schematic diagram of yet another embodiment of the OCP compensation circuit 25 shown in FIG. 2. An OCP compensation circuit 45 includes an attenuator 451, a peak/valley holding circuit 452, an inverter 453, and an adder 454. The attenuator 451 attenuates the first pulsating DC voltage Va by a factor of X to produce a second pulsating DC voltage Vx (i.e., Vx=Va/X, where X is a real number). The peak/valley holding circuit 452 detects, cycle by cycle, a peak value PH and a valley value VH of the second pulsating DC voltage Vx, and holds them to output. The inverter 453 performs a negation operation on the second pulsating DC voltage Vx to produce a voltage V3 (i.e., V3=−Vx) which inversely varies with the first pulsating DC voltage Va. The adder 454 adds the peak value PH, the valley value VH, and the fixed OCP setting value Vset to the voltage V3 to produce a compensated OCP setting value Vocp; that is, Vocp=V3+PH+VH+Vset=−Vx+PH+VH+Vset. In the embodiment, the OCP compensation value Vcp=−Vx+PH+VH.

Figure 7:
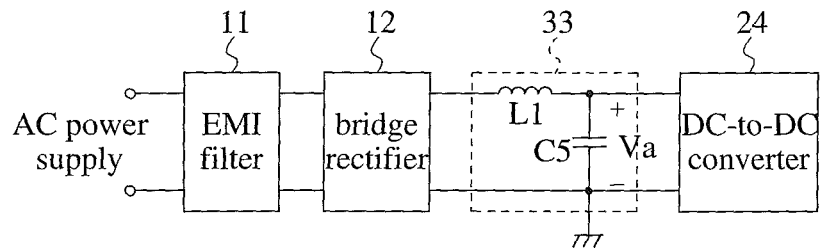
FIG. 7 is a schematic diagram of another embodiment of the film capacitor shown in FIG. 2.

Referring to FIG. 7, there is shown a schematic diagram of another embodiment of the film capacitor 23 shown in FIG. 2. In the embodiment, the film capacitor 23 is replaced by a low-pass LC filter 33. The low-pass LC filter 33 includes an inductor L1 and a film capacitor C5, and the low-pass LC filter 33 is coupled between the bridge rectifier 12 and the DC-to-DC converter 24. The film capacitor C5 may be the film capacitor 23 shown in FIG. 2. In other words, the low-pass LC filter 33 may be implemented by the film capacitor 23 shown in FIG. 2 coupled in series with the inductor L1 in front. The low-pass LC filter 33 has better filtering performance than the single film capacitor 23.

Figure 8:
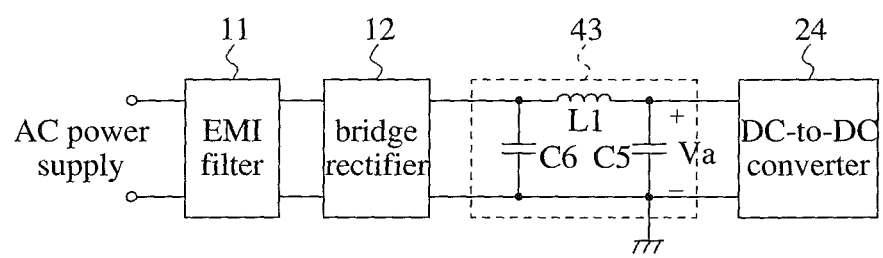
FIG. 8 is a schematic diagram of yet another embodiment of the film capacitor shown in FIG. 2.

Referring to FIG. 8, there is shown a schematic diagram of yet another embodiment of the film capacitor 23 shown in FIG. 2. In the embodiment, the film capacitor 23 is replaced by a low-pass π filter 43. The low-pass π filter 43 includes a film capacitor C6, an inductor L1, and a film capacitor C5, and the low-pass π filter 43 is coupled between the bridge rectifier 12 and the DC-to-DC converter 24. The film capacitor C5 may be the film capacitor 23 shown in FIG. 2. In other words, the low-pass π filter 43 may be implemented by the film capacitor 23 shown in FIG. 2 coupled in series with the inductor L1 in front and then coupled in parallel with the film capacitor C6 in front. The low-pass π filter 43 has better filtering performance than the low-pass LC filter 33, especially for filtering the conducted EMI noise generated by the switching of the power transistor Q1 to prevent the pollution of the mains to which the AC power supply is coupled.

Either the film capacitor 23 shown in FIG. 2, or the low-pass LC filter 33 shown in FIG. 7, or the low-pass π filter 43 shown in FIG. 8 may change the capacitance value(s) of the film capacitor(s) and/or the inductance value of the inductor to change the magnitude of ripple (or the valley value) of the first pulsating DC voltage Va no matter under the light load or the heavy load condition.

The foregoing descriptions of the embodiments and their accompanying drawings of the invention are intended to illustrate and not to limit the invention. Various changes and modifications may be made to the embodiments without departing from the spirit of the invention. Therefore, the scope of the invention is to be limited only by the appended claims.

What is claimed is:

1. A power supply comprising:
a bridge rectifier receiving an input voltage of an alternating-current (AC) power supply, and rectifying the input voltage to produce a full-wave rectified voltage;
a film capacitor receiving the full-wave rectified voltage, and filtering the full-wave rectified voltage to produce a first pulsating direct-current (DC) voltage; and
a DC-to-DC converter comprising a control circuit, with the control circuit receiving the first pulsating DC voltage, sampling the first pulsating DC voltage to produce a second pulsating DC voltage, detecting a peak value and a valley value of the second pulsating DC voltage, and producing an over current protection (OCP) compensation value according to the second pulsating DC voltage, the peak value and the valley value, with the OCP compensation value being −(Vx−VH)+PH, where Vx refers to the second pulsating DC voltage, VH refers to the valley value, and PH refers to the peak value, with the control circuit providing an OCP function and a constant output power limitation for the DC-to-DC converter according to a compensated OCP setting value produced by adding the OCP compensation value to an OCP setting value.

2. The power supply as claimed in claim 1, wherein the control circuit comprises:
an attenuator attenuating the first pulsating DC voltage to produce the second pulsating DC voltage;
a peak/valley holding circuit detecting the peak value and the valley value of the second pulsating DC voltage;
a subtractor subtracting the valley value from the second pulsating DC voltage to produce a first voltage;
an inverter performing a negation operation on the first voltage to produce a second voltage; and
an adder adding the peak value and the OCP setting value to the second voltage to produce the compensated OCP setting value.

3. The power supply as claimed in claim 1, wherein the control circuit comprises:
an attenuator attenuating the first pulsating DC voltage to produce the second pulsating DC voltage;
a peak/valley holding circuit detecting the peak value and the valley value of the second pulsating DC voltage;
a subtractor subtracting the peak value from the second pulsating DC voltage to produce a first voltage;
an inverter performing a negation operation on the first voltage to produce a second voltage; and
an adder adding the valley value and the OCP setting value to the second voltage to produce the compensated OCP setting value.

4. The power supply as claimed in claim 1, wherein the control circuit comprises:
an attenuator attenuating the first pulsating DC voltage to produce the second pulsating DC voltage;
a peak/valley holding circuit detecting the peak value and the valley value of the second pulsating DC voltage;
an inverter performing a negation operation on the second pulsating DC voltage to produce a voltage; and
an adder adding the peak value, the valley value and the OCP setting value to the voltage to produce the compensated OCP setting value.

5. The power supply as claimed in claim 1, further comprising an electromagnetic interference (EMI) filter, with the bridge rectifier receiving the input voltage passing through the EMI filter.

6. The power supply as claimed in claim 1, further comprising an inductor, with the inductor and the film capacitor composing a low-pass LC filter coupled between the bridge rectifier and the DC-to-DC converter.

7. The power supply as claimed in claim 1, further comprising an inductor and another film capacitor, with the inductor, the film capacitor and the another film capacitor composing a low-pass π filter coupled between the bridge rectifier and the DC-to-DC converter.

8. The power supply as claimed in claim 1, wherein the DC-to-DC converter comprises a flyback converter.

* * * * *